(12) United States Patent
Eyuboglu et al.

(10) Patent No.: US 6,198,776 B1
(45) Date of Patent: *Mar. 6, 2001

(54) DEVICE AND METHOD FOR PRECODING DATA SIGNALS FOR PCM TRANSMISSION

(75) Inventors: M. Vedat Eyuboglu, Concord; Pierre A. Humblet, Cambridge; Dae-young Kim, Lexington, all of MA (US)

(73) Assignee: Motorola Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/999,249

(22) Filed: Dec. 29, 1997

Related U.S. Application Data

(63) Continuation-in-part of application No. 08/747,840, filed on Nov. 13, 1996, now Pat. No. 5,818,075.

(51) Int. Cl.[7] .................................................. H04L 25/49
(52) U.S. Cl. .......................................... 375/286; 375/295
(58) Field of Search .................................. 375/286, 216, 375/242, 222, 295; 379/93.01

(56) References Cited

U.S. PATENT DOCUMENTS

| 5,394,437 | 2/1995 | Ayanoglu et al. | 375/222 |
| 5,528,625 | 6/1996 | Ayanoglu et al. | 375/222 |
| 5,659,579 | 8/1997 | Herzberg | 375/262 |
| 5,825,816 | * 10/1998 | Cole et al. | 375/222 |

FOREIGN PATENT DOCUMENTS 01657   10/1997   (FR).

OTHER PUBLICATIONS

Dagdeviren, Nuri; "Proposed Baseline For PCM Upstream," Document Number: TR–30.Dec. 1996. Lucent Technologies; Midletown, NJ. Email: dagdeviren @lucent.com. Dec. 4–5, 1996.

Eyuboglu, Vedat; "Generalized Spectral Shaping for PCM Modems," Telecommunications Industry Association, TR30.1 Meeting, Norcross, Georgia, Apr. 9–11, 1997. pp. 1–5.

Eyuboglu, Vedat; "Convolutional Spectral Shaping," Telecommunications Industry Association, TR30.1 Meeting, Norcross, Georgia, Apr. 9–11, 1997. pp. 1–4.

Eyuboglu, Vedat; "More on Convolutional Spectral Shaping," ITUTelecommunications Standardization Sector 009, V.pcm Rapporteur Meeting, La Jolla, CA, May 5–7, 1997, pp. 1–5.

Eyuboglu, Vedat; "Draft Text for Convolutional Spectral Shaping," ITU–T SG 16 Q23 Rapporteur's Meeting, Sep. 2–11, 1997, Sun River, Oregon; p. 1–2.

Eyuboglu, Vedat; "A Comparison of CSS and Maximum Inversion," Telecommunications Industry Association, TR30.1 Meeting on PCM Modems, Galveston, Texas, Oct. 14–16, 1997; 6 pages.

(List continued on next page.)

Primary Examiner—Temesghen Ghebretinsae
(74) Attorney, Agent, or Firm—Joanne N. Pappas; John W. Powell

(57) ABSTRACT

A device and method for preceding data signals for pulse code modulation (PCM) transmission includes a transmitter for transmitting a sequence of analog levels over an analog channel to a quantization device, wherein the analog channel modifies the transmitted analog levels, the transmitter comprising: a mapping device for mapping data bits to be transmitted to a sequence of equivalence classes, wherein each equivalence class contains one or more constellation points; and a constellation point selector interconnected to the mapping device which selects a constellation point in each equivalence class to represent the data bits to be transmitted and which transmits an analog level that produces the selected constellation point at an input to the quantization device.

31 Claims, 10 Drawing Sheets

OTHER PUBLICATIONS

Eyuboglu, Vedat; "Draft Text for Convolutional Spectral Shaping," Telecommunications Industry Association, TR30.1 Meeting Galveston, Texas, Oct. 14–16, 1997; 2 page.

Herzberg, Hanan; "Coding for a Channel with Quantization in the Presence of an Estimable Interference," IEEE Transaction On Communications, vol. 45, No. 1, Jan. 1997, pp. 45.51.

* cited by examiner

DEVICE AND METHOD FOR PRECODING DATA SIGNALS FOR PCM TRANSMISSION

RELATED APPLICATIONS

This application is a continuation-in-part of U.S. application Ser. No. 08/747,840, now U.S. Pat. No. 5,818,075 filed Nov. 13, 1996, which is hereby incorporated by reference in its entirety.

FIELD OF INVENTION

This invention relates to a device and method for preceding data signals for pulse code modulation (PCM) transmission.

BACKGROUND OF INVENTION

Conventional modems, such as V.34 modems, treat the public switched telephone network (PSTN) as a pure analog channel even though the signals are digitized throughout most of the network. In contrast, pulse code modulation (PCM) modems take advantage of the fact that most of the network is digital and that typically central site modems, such as those of internet service providers and on-line services, are connected to the PSTN via digital connections (e.g., T1 in the United States and E1 in Europe). First generation PCM modems transmit data in PCM mode downstream only (i.e., from a central site digital modem to an analog end user modem) and transmit in analog mode, e.g. V.34 mode, upstream (i.e., from the end user modem to the central site modem). Future generation PCM modems will also transmit data upstream in PCM mode.

With PCM downstream, the central site PCM modem transmits over a digital network eight bit digital words (octets) corresponding to different central office codec output levels. At the end user's central office, the octets are converted to analog levels which are transmitted over an analog loop. The end user's PCM modem then converts the analog levels, viewed as a pulse code amplitude modulated (PAM) signal, into equalized digital levels. The equalized digital levels are ideally mapped back into the originally transmitted octets and the data the octets represent.

With PCM upstream, the end user PCM modem transmits analog levels over the analog loop corresponding to data to be transmitted. The analog levels are modified by the channel characteristics of the analog loop and the modified levels are quantized to form octets by a codec in the end user's central office. The codec transmits the octets to the PCM central site modem over the digital network. The PCM central site modem determines from the octets the transmitted levels and from the levels the data transmitted by the end user PCM modem is recovered.

A difficulty that exists with upstream PCM transmission is that the levels transmitted by the end user PCM modem are modified by the analog loop. Since these modified levels are the levels that are quantized to form octets by the codec, and not the levels that are actually transmitted, it can be difficult for the central site modem to accurately determine from the octets the data being transmitted by the end user PCM modem. This difficulty is compounded by the fact that there is a channel null in the analog loop, quantization noise introduced by the codec in the end user's central office and downstream PCM echo, which make it more difficult for the central site PCM modem to accurately recover the data transmitted.

Therefore, a need exists for a device and method for precoding data signals for PCM transmission such that the analog levels that are transmitted by the end user PCM modem accurately produce predetermined analog levels (constellation points) at the input to the codec in the end user's central office, which analog levels (constellation points) correspond to the data to be transmitted by the end user PCM modem. Moreover, there is a need for a device, system and method for preceding data signals for PCM transmission which limits the transmit power and combats a channel null introduced by the analog loop and quantization noise introduced by the codec in the end user's central office.

DETAILED DESCRIPTION OF A PREFERRED EMBODIMENT

There is first described below a technique for PCM downstream spectral shaping or preceding of data signals.

Then, there is described a preceding technique for PCM upstream transmission of data signals. Finally, it is described how the PCM upstream preceding technique according to this invention may be generalized for use in a PCM communication system interconnecting two analog PCM modems, as opposed to the typical analog PCM modem and digital PCM modem interconnection.

PCM Downstream Spectral Shaping/Precoding

Figure 1:
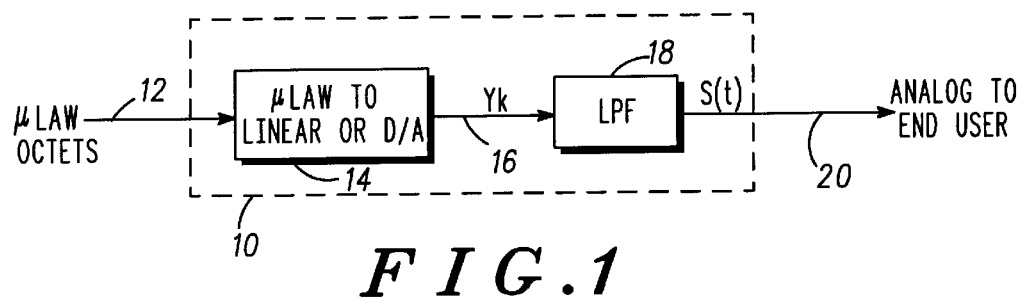
FIG. 1 is a simplified block diagram of a typical telephone company central office.
Figure 2:
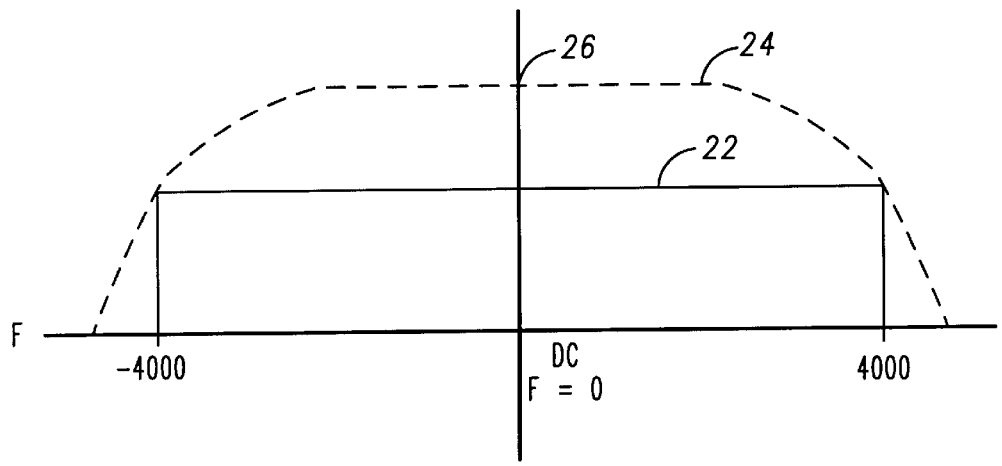
FIG. 2 is plot of the frequency spectrum of the $y_k$ signals output from the $\mu$-law to linear converter of FIG. 1 and the spectral shape of the low pass filter of FIG. 1.

FIGS. 1 and 2 illustrate the presence of energy near DC in the signals transmitted to a remote user's modem over an analog loop. There is shown in FIG. 1 a portion of a typical telephone central office on a PSTN which receives at input 12 $\mu$-law octets transmitted from a modem (transmitting modem, not shown) directly attached to the digital portion of the telephone system, such as the one described in the co-pending applications referred to above which directly encodes the digital data into octets for transmission. These octets are converted by a D/A converter, also known as a $\mu$-law to linear converter 14, to a sequence of voltage levels, $y_k$, each level being one of 255 $\mu$-law levels. The levels are output over line 16 to a LPF 18 which outputs over analog loop towards the remote modem's receiver a filtered analog signal s(t) which is an analog representation of the levels. The analog signal is demodulated and decoded by the receiving modem which outputs a digital bitstream which is an estimate of the originally transmitted data.

The sequence of levels $y_k$ on line 16 from $\mu$-law to linear converter 14 has a flat frequency response 22, FIG. 2. The spectral shape 24 of LPF 18 contains a significant amount of energy near DC (f=0) as illustrated at point 26. Since the sequence $y_k$ has a flat frequency response, the spectrum of the signal s(t) output by filter 18 has the same spectral shape 24 as the filter 18 and therefore the signal s(t) also contains a significant amount of energy near DC. As described above, this energy near DC tends to saturate the transformers on the system which produces unwanted non-linear distortion in the signal s(t) transmitted towards the receiving modem.

Figure 3:
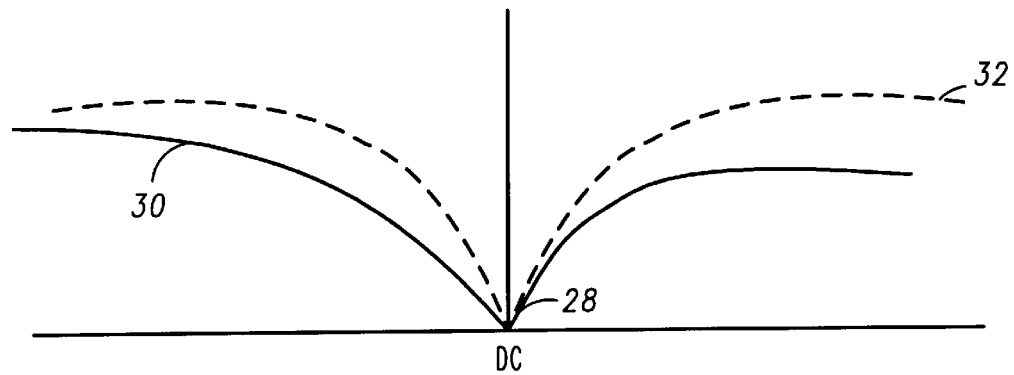
FIG. 3 is a plot of a portion of two frequency spectrums each having a null at DC, wherein one spectrum falls off to zero very abruptly at DC and the other spectrum falls off more gradually.

In some applications this distortion must be reduced. This can be accomplished by reducing the signal energy near DC in the transmitted signal. Such a DC null 28 is depicted in FIG. 3. As is known in the state-of-the-art, in order to create this spectral null at DC in the transmitted signal, the running digital sum (RDS) of the transmitted levels $y_k$ (namely, the algebraic sum of all previously transmitted levels) must be kept close to zero. The shape of the spectrum around the DC null 28 can vary from a relatively shallow sloped spectrum 30 to a spectrum 32 which falls off very abruptly at DC. The sharpness of the null depends on how tightly the RDS is controlled.

The present invention accordingly encodes the digital data being transmitted into $\mu$-law octets in a manner that maintains the RDS near zero to create the desired spectral null at DC thereby reducing the non-linear distortion caused by transformer saturation.

To illustrate the method of creating a spectral null, we consider an example of transmitting 6 bits with every symbol $y_k$. It will be apparent to those skilled in the art that the invention can be used for transmitting any other number of bits per symbol, or when the number of bits per symbol transmitted varies from symbol to symbol. In a system without a spectral null, one first selects a subset of 64 levels from the available 255 $\mu$-law levels such that a minimum distance $d_{min}$ between levels is maintained. These 64 levels are symmetric in the sense that for every positive level there is a negative level of the same magnitude. For example, one can achieve a $d_{min}$ of 32 for an average energy well under −12 dBm0, the regulatory limit.

Figure 4:
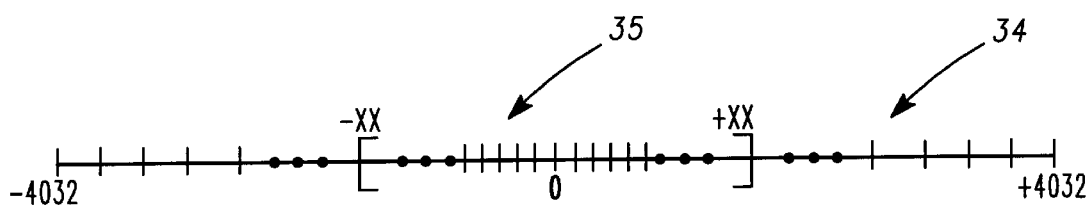
FIG. 4 is a diagrammatic representation of a portion of a typical $\mu$-law constellation.

A partial representation of all 255 $\mu$-law levels 34 (128 positive and 127 negative) is shown in FIG. 4. These levels follow a logarithmic law, with the 64 levels closest to the origin being uniformly spaced between −63 and 63 with a spacing of 2. The next positive and negative segments start at +/−66 and they each contain 16 points spaced by 4. The scale continues with segments of 16 points, each with a spacing of the form $2^n$ separated from the previous segment by a spacing of $0.75 * 2^n$. The final segments extend between +/−2112 and +/−4032 with a spacing of 128. The set 35 is the set of 64 levels selected from these 255 levels to represent each combination of six bits, i.e. $2^6$=64.

In the transmitter, incoming bits are collected in groups of 6, and then mapped into $\mu$-law octets, which represent the desired level. In the central office, the $\mu$-law octets are converted into levels, and the resulting levels are then transmitted. In the receiver, an equalizer compensates for the distortion introduced by the LPF and the local loop, and then a decision device estimates the transmitted level, by selecting the level that is closest to the received point.

In order to achieve spectral shaping in the above example, additional levels are also used, but the minimum distance between levels is still kept at 32. For example, consider the case where 92 levels are used. First, these 92 levels are divided into equivalence classes. There are a number of different ways for generating these equivalence classes. One particularly useful way is described here: we label the levels by integers 0 through 91, for example by assigning the label 0 to the smallest (most negative) level, the label 1 to the next smallest level, and so on. Then, we define 64 "equivalence classes" by grouping together levels whose labels differ exactly by 64. Such grouping leads to 36 equivalence classes with only one level corresponding to one of 36 innermost levels of smallest magnitude, and 28 equivalence classes with two levels whose labels differ by 64. Other methods for generating the equivalence classes may be used. Each possible combination of 6 bits to be transmitted is then represented by an equivalence class.

For example, the bit combination 000000 may correspond to the first equivalence class which consists of two levels each being represented by a different octet. Note that it is not necessary to use the full dynamic range of the D/A converter. The technique can work with any number of levels, as long as more than 64 levels are used. Of course, the more levels used, the better the desired spectral shape can be achieved. Our experiments indicate that very few additional levels need to be considered for generating a DC null with a relatively sharp notch.

In the above example, since each combination of six information bits is represented by an equivalence class and often there is more than one level in an equivalence class, the information bits must be mapped into one of the levels in a selected equivalence class before an octet representing that level is transmitted. This function is described below with regard to FIGS. 5–7.

Figure 5:
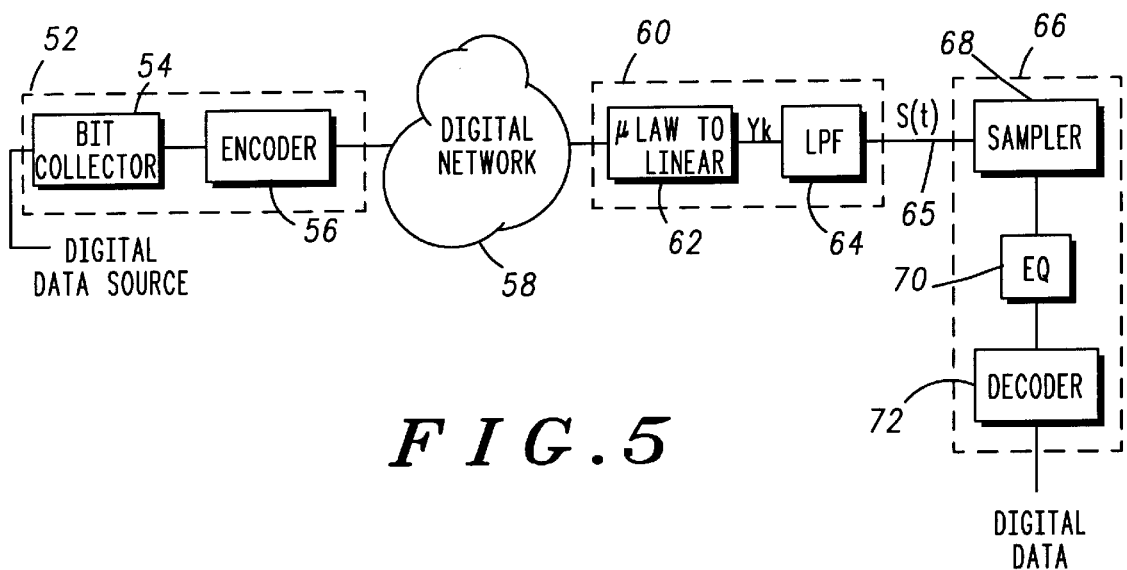
FIG. 5 is a block diagram of a modem data connection over the telephone system including a transmitter for spectrally shaping signals according to this invention.

Transmitter 52, FIG. 5, receives from a digital data source, such as a computer, a bitstream of digital data and with bit collector 54 divides the bits into groups of six, for example. Each six-bit group is provided to encoder 56 which selects the equivalence classes from which the desired levels to achieve the spectral null at DC will be selected. The octets which represent the selected levels are output from encoder 56, transmitted over digital circuit-switched telephone network 58 and arrive at the remote user's central office 60. At central office 60, the octets are converted by $\mu$-law to linear converter 62 to the levels, $y_k$, which pass through LPF 64 and are output over local analog loop 65 as a signal s(t)

having a spectral null at DC. In receiver 66, the signal s(t) is sampled by sampler 68, an equalizer 70 compensates for the distortion introduced by LPF 64 and the local loop, and then a decision device or decoder 72 estimates the transmitted level by selecting the level that is closest to the received point. From the level the decoder 72 determines the equivalence class and then recovers the six information bits by performing an inverse mapping function.

The operation of receiver 66 is essentially unchanged as compared to the receiver described in the co-pending applications referred to above. The only difference is that the receiver now needs to consider a larger set of possible levels and the inverse mapping involves the determination of the equivalence class. Equalizer 70 compensates for the linear distortion introduced by the LPF 64 and the local loop 65, as described in the co-pending applications. For example, when a linear equalizer is used, the output of the equalizer can be represented as follows:

$$rk=yk+nk \quad (1)$$

where nk is the total noise plus distortion present at the output of the equalizer. Decoder 72 then selects the levels $y_k$ nearest to rk as the decision, determines its equivalence class, and then recovers the six information bits by an inverse map.

If the equalizer includes a maximum-likelihood sequence estimator (e.g., the Viterbi equalizer), then the received signal can be represented in the form $$rk=\Sigma yk-j\ fj+nk, \quad (2)$$

and this time, the decoder selects the closest sequence $\{y_k\}$ using a Viterbi decoder. For each estimated symbol $y_k$, the decoder determines its equivalence class and then finds the six information bits via an inverse map.

Figure 6:
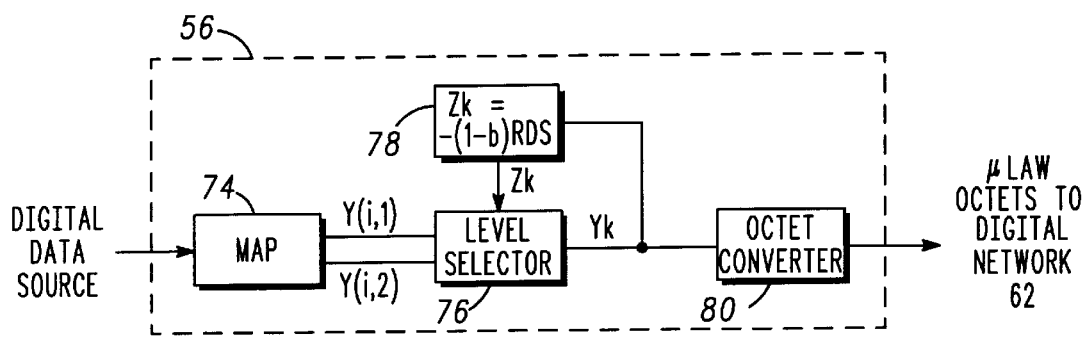
FIG. 6 is a block diagram of the encoder of FIG. 6 used specifically for creating a DC null in said analog signals over an analog loop of the PSTN.

Encoder 56, FIG. 6, includes MAP 74 which is a look-up table containing for each possible combination of the six-bit groups of data received from bit collector 54, FIG. 5, levels representing each equivalence class i, where i is an integer between 0 and 63. Each level, two in this example, y(i,1) and y(i,2) is provided to level selector 76 where a decision is made as to which level, $y_k$, is to be transmitted.

This decision is made as follows. First, encoder 56 keeps track of the running digital sum (RDS) of the transmitted levels, $y_k$, by feeding back the output of level selector 76 to function block 78. From the previously transmitted levels, $y_k$, function block 78 calculates the weighted RDS, $z_k$=-(1-b)RDS, where 0≦b<1 is weighting factor. Because of D/A nonlinearities, the exact values of the $y_k$ levels may not be known in encoder 56; however, this should not have a significant effect. It is possible to determine the error and send this information back to encoder 56 to make these calculations more accurate.

Given the group of six bits to be transmitted, level selector 76 selects as the level $y_k$ from the equivalence class $\{y(i,1), y(i,2)\}$ the level closest to the weighted RDS. It can be seen that when the RDS is positive, zk will be negative and vice versa. This enables the encoder to choose a level, $y_k$, from each equivalence class such that when its value is added to the RDS it will bring it closer to zero than the other levels in the equivalence class. After selecting the level yk the octet which represents the level $y_k$ is determined by octet converter 80 and transmitted over the digital network. The value of the transmitted octet can be obtained from a look-up table.

The variable b is a weighting factor that controls the trade-off between the sharpness of the spectral null and the average energy of the transmitted signal. Our analysis has shown that when the number of levels is sufficiently larger than the number of equivalence classes, the sequence $y_k$ will have a spectrum which can be approximated by the filter response h(D)=(1-D)/(1-bD). Clearly, when b=0, we find that h(D)=1-D, which is the well-known Class I Partial Response with a sinusoidal spectral shape having a null at DC. On the other hand, as b approaches 1, the spectrum becomes flat across much of the band except for a very sharp spectral null at DC. It can be seen that for b=0, the average energy of $y_k$ will be twice as large as in the case of a flat spectral shape. As b approaches 1, however, the average energy increase will disappear. In some applications, it may be desirable to keep the constellation expansion, measured by the ratio of the number of levels to the number of equivalence classes. It will be apparent to those skilled in the art that the invention can be used with constellations of any number of levels, and with any smaller number of equivalence classes.

The present invention may be more broadly utilized to spectrally shape, as desired, the analog signals output from the $\mu$-law to linear converter at the central office. The example described above is a specific case of using this invention to reduce the energy of the transmitted signal around DC, but the principals of this invention used in that example can be generalized to spectrally shape signals in numerous ways, for example, to pre-equalize the signals.

Figure 7:
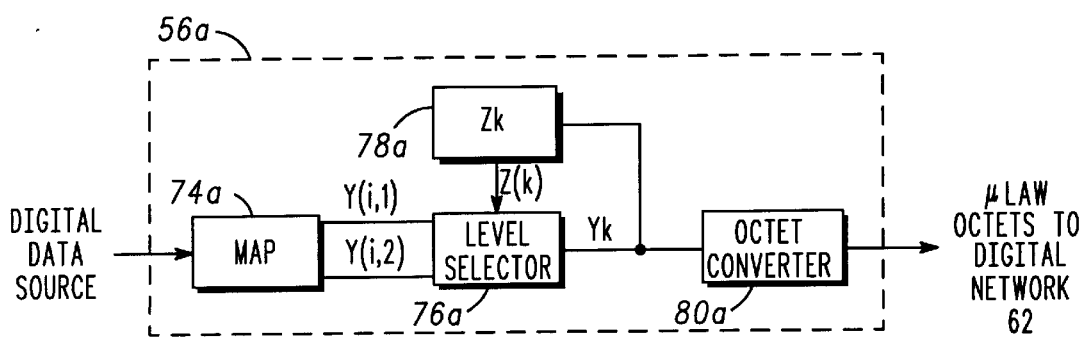
FIG. 7 is a block diagram of the encoder of FIG. 6 which may be used generally for modifying, as desired, the frequency spectrum of the signals output from the analog loop to the end user.

A generic version of the encoder of this invention, encoder 56a, is shown in FIG. 7. The only difference between this general case and the special case of a spectral null described above is how the sequence or spectral function zk is generated. Let h(D) be a monic, causal impulse response of a filter representing the desired spectral shape, where D is a delay operator. Suppose we represent the sequences $\{yk\}$ and $\{zk\}$ using D-transform notation as y(D) and z(D), respectively. Then, the sequence z(D) can be represented as $$z(D)=(1-1/h(D))y(D). \quad (3)$$

A close examination of this equation reveals that at a given time k, zk only depends on past values of yk, and therefore can be determined recursively. Thus, for each six bit group, encoder 56a determines which level from the associated equivalence class is nearest in value to $z_k$ and selects that level. The octet representing that level is then transmitted. Again, our analysis shows that for sufficiently large number of levels the sequence $\{y_k\}$ transmitted by the central office 60 will have a spectrum closely approximating the spectrum of the filter with response h(D).

The technique described here can also be used in conjunction with a more complex scheme for mapping the information bits to equivalence classes. For example, it can be used in conjunction with shell mapping, a mapping technique used in the V.34 high-speed modem specification.

The examples described above are for an uncoded system. However, the principals can be easily applied to a coded system, for example a trellis coded system. The only difference in this case is that the equivalence classes are further partitioned into subsets, which are used to construct the trellis code.

For example, when a one-dimensional trellis code based on a 4-way set partition is utilized together with the same 64-level signal constellation to send bits per symbol, the equivalence classes are partitioned into subsets as follows: $a_1, b_1, c_1, d_1, a_2, b_2, c_2, d_2, \ldots a_n, b_n, c_n, d_n$. In the example described above, the 64 equivalence classes would be partitioned into four subsets each containing sixteen equivalence classes. The output of a rate-½ convolutional encoder, e.g. two of the six bits in a group, then determines the subset, and the remaining four "uncoded" bits select the specific equivalence class within the subset. The actual level from the chosen equivalence class in the chosen subset is selected as described above. The operation of the encoder is otherwise unchanged.

Of course, when trellis coding is utilized, the receiver will use a decoder to select the most likely sequence. The trellis decoder may also be an equalizer, jointly decoding the trellis code and equalizing for intersymbol interference.

It may also be possible to use the present invention to enable detection of loss of frame synchronization in a receiver. This can be accomplished by infrequently, but periodically violating the rule for selecting the signal point in a given equivalence class, where the period is chosen to be an integer multiple of the desired framing. A loss of frame synchronization, can be detected in the receiver by monitoring such rule violations. The receiver can also reacquire frame synchronization or may simply request a synchronization pattern (training sequence) from the transmitter.

PCM Upstream Precoding

Figure 8:
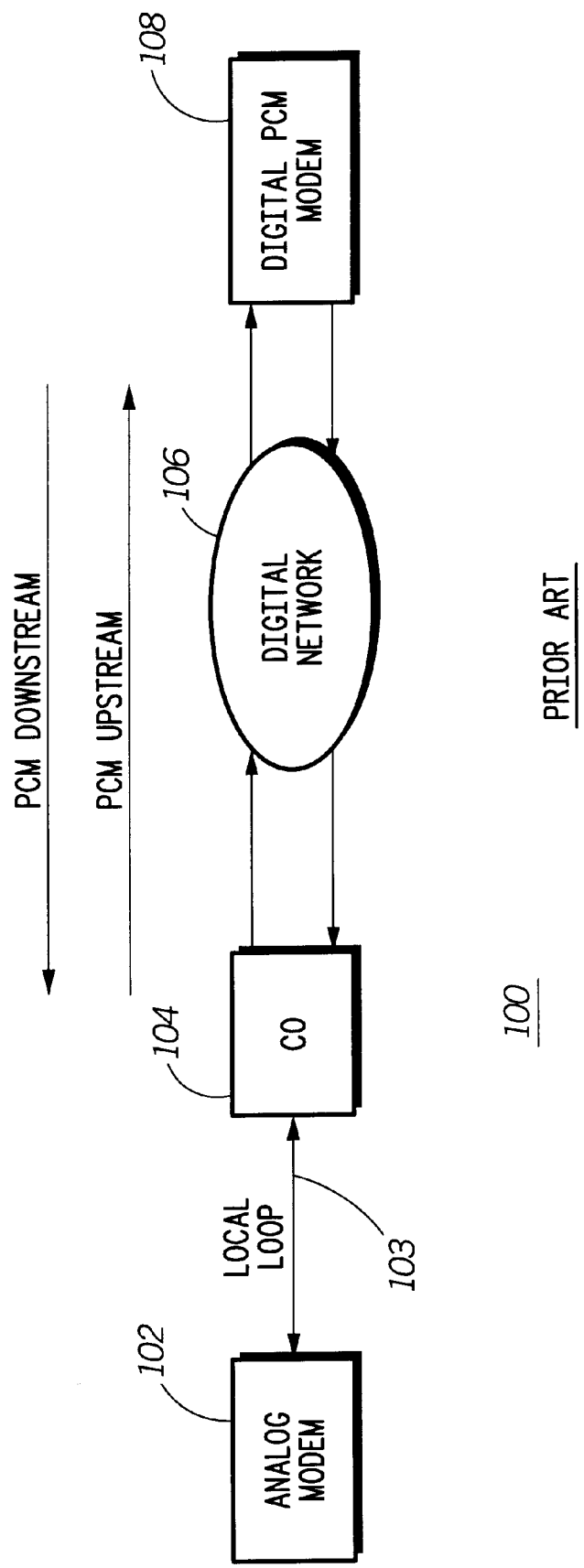
FIG. 8 is a block diagram of a typical analog PCM modem to digital PCM modem communication system.

There is shown in FIG. 8, a typical PCM communication system 100. System 100 includes analog PCM modem 102 connected to a telephone company central office (CO) 104 over a local analog loop or channel 103. There is also included a digital network 106 which is interconnected to CO 104 and to digital PCM modem 108. With this system, PCM data may be transmitted both in the downstream direction (i.e., from digital PCM modem 108 to analog PCM modem 102) and in the upstream direction (i.e., from analog PCM modem 102 to digital PCM modem 108). This type of bidirectional PCM communication system is described in U.S. application Ser. No. 08/724,491, entitled Hybrid Digital/Analog Communication Device, which is assigned to the assignee of the present invention and which is incorporated herein in its entirety by reference.

In the above section a technique for PCM downstream spectral shaping or precoding of data signals is described. In this section there is described a precoding technique for PCM upstream precoding of data signals.

Figure 9:
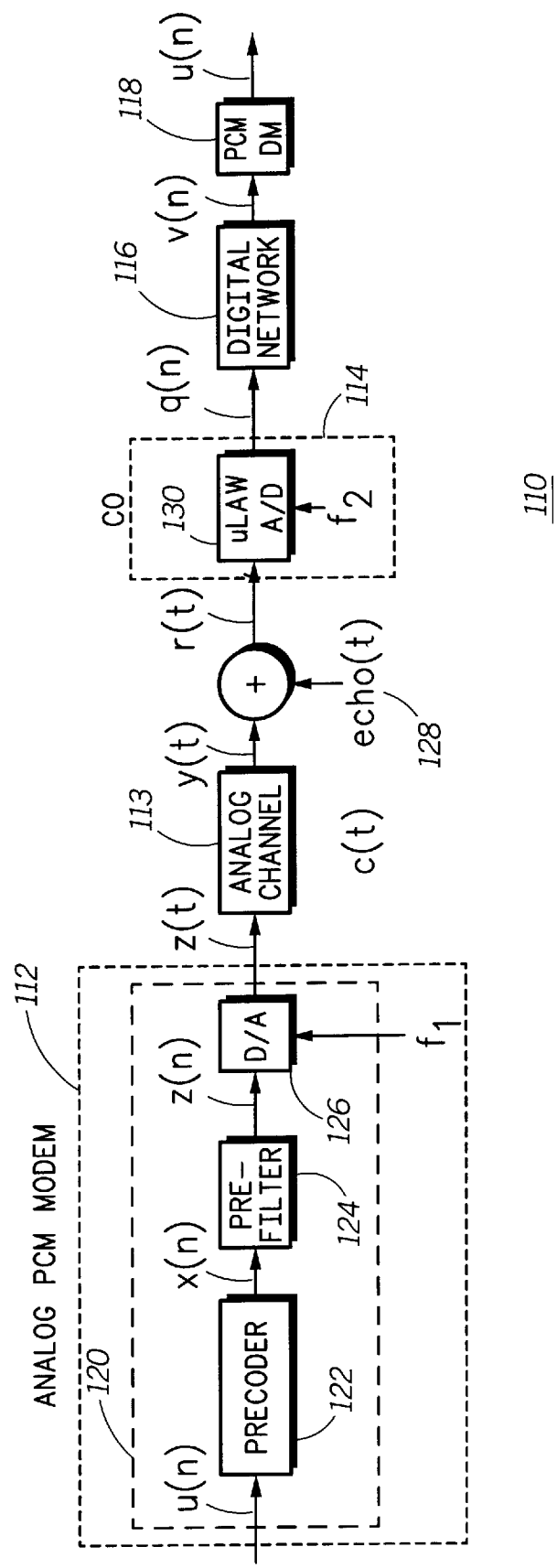
FIG. 9 is a more detailed block diagram depicting PCM upstream transmission according to this invention.

In FIG. 9 there is shown in block diagram 110, an example of PCM upstream transmission in accordance with this invention. In block diagram 110 there is included analog PCM modem 112 interconnected to analog channel 113. Analog PCM modem 112 includes transmitter 120 having a precoder 122, prefilter 124 and a digital to analog converter (D/A) 126. Precoder 122 receives digital data u(n) and outputs precoded digital data signal x(n). The precoded digital data signal is filtered by prefilter 124 to form signal z(n) which is provided to D/A 126. D/A 126 converts the filtered signal z(n) to analog form and transmits analog signal, z(t), over analog channel 113, having a channel characteristic, c(t).

The analog channel modifies the transmitted signal z(t) to form signal y(t). The signal y(t) then encounters downstream PCM echo, echo(t) 128, that is added to y(t), producing signal r(t). Signal r(t) is received by $\mu$-law (A-law in some countries outside of the US) quantizer 130 in central office (CO) 114 and is quantized according to the $\mu$-law. See International Telecommunications Union, Recommendation G.711, Pulse Code Modulation (PCM) of Voice Frequencies, 1972.

The quantized octets (digital values), q(n), are transmitted over digital network 116 at a frequency of 8 kHz where they may be affected by various digital impairments, as discussed below. The possibly affected octets, v(n), are received by digital PCM modem 118 which ideally decodes the octets, v(n), into their corresponding constellation points, y(t), from which the original digital data, u(n), can be recovered. The decoding of v(n) is described in co-pending application Ser. No. 08/999,254 entitled System, Device and Method for PCM Upstream Transmission Utilizing an Optimized Transmit Constellation, CX097028, which is assigned to the assignee of the present invention and which is incorporated herein in its entirety by reference.

Before data can be transmitted upstream, the clock ($f_1$) of D/A 126 in analog PCM modem 112 must be synchronized to the clock ($f_2$) of CO 114. This can be achieved by learning the clock from the downstream PCM signal (not shown) and synchronizing the clocks using the technique proposed in U.S. Pat. No. 5,199,046, entitled First and Second Digital Rate Converter Synchronization Device and Method, incorporated herein by reference in its entirety. Once the clocks are synchronized, PCM upstream block diagram 110, FIG. 9, can be represented as equivalent discrete time block diagram 110', FIG. 10, with like components being represented by the same reference numbers containing a prime ('). In block diagram 110' it is assumed that $f_1=f_2$; however, it must be noted that $f_1$ does not have to be equal to $f_2$ as long as the two clocks are synchronized. When $f_1$ is equal to $f_2$, n is the time index for 8 kHz samples, since the clock ($f_2$) of CO 24 is fixed at that frequency.

Figure 10:
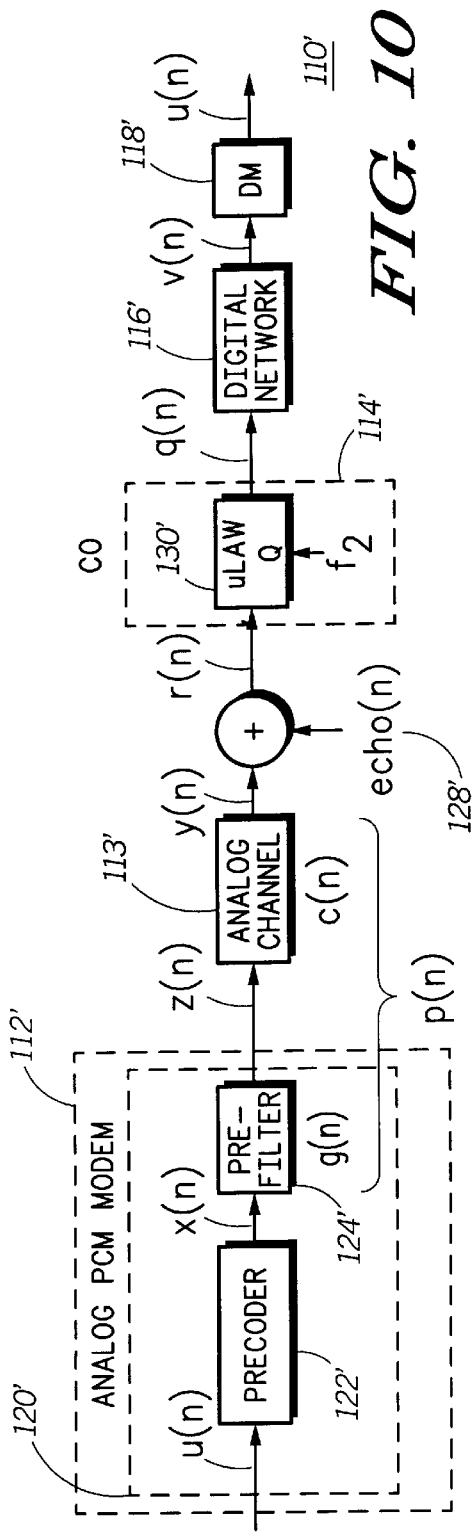
FIG. 10 is an equivalent discrete time block diagram of the block diagram of FIG. 9.
Figure 11:
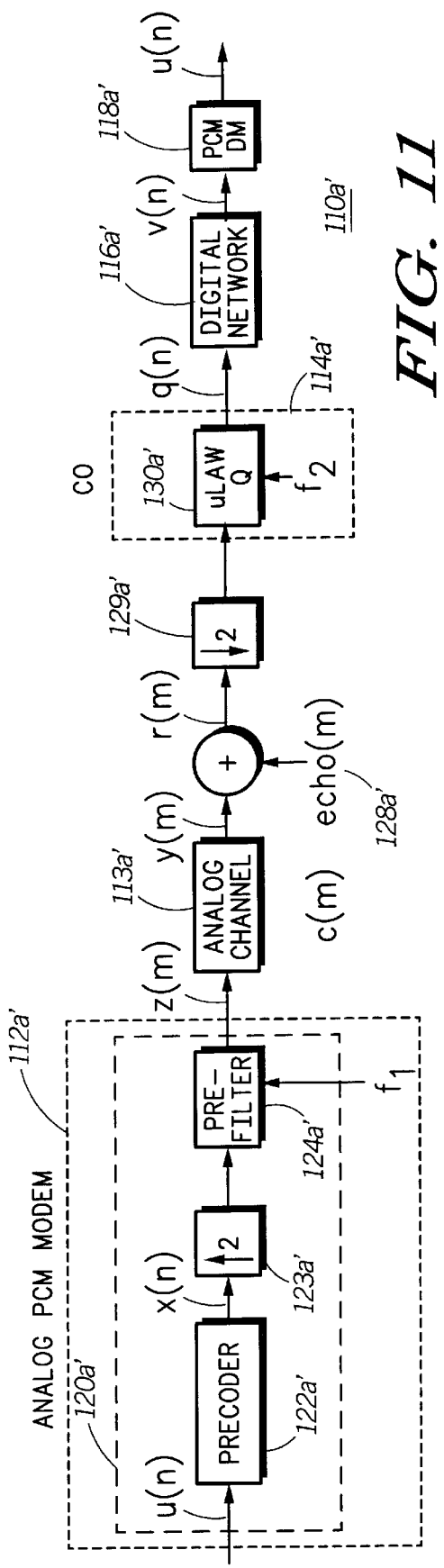
FIG. 11 is the equivalent discrete time block diagram of the block diagram of FIG. 9 with the analog modem sampling rate twice that of the CO sampling rate.

An example where $f_1$ does not equal $f_2$ is depicted in FIG. 11. Equivalent discrete time block diagram 110a', FIG. 11, is the same as equivalent discrete time block diagram 110', FIG. 10, except that there is a 2× up-sampler 123a' in transmitter 120a' and a 2× down-sampler 129a' to account for the fact that $f_1=2f_2$. The variables "m" and "n" are the time indexes for 16 kHz and 8 kHz samples, respectively.

Precoder 122' and prefilter 124', according to this invention, are designed to transmit signal z(n) over analog channel 113 such that predetermined constellation points, y(n), corresponding to digital data u(n) are produced at the input of $\mu$-law quantizer 130' (in combination with an echo component, echo(n), if present). In other words, the input of $\mu$-law quantizer 130' is y(n)+e(n) in the presence of echo(n) and just y(n) in the absence of echo(n).

Using the PCM upstream precoding technique described below, or another precoding technique, it is difficult for digital PCM modem 118' to accurately decode u(n) from v(n) in the presence of echo, quantization and digital impairments without a properly designed transmit constellation of points, y(n). It is described in co-pending application CX097028 how to design the transmit constellation for y(n) to enable y(n) (and eventually u(n)) from v(n)) to be decoded in the presence of echo, quantization and digital impairments with minimized error probability.

Figure 12:
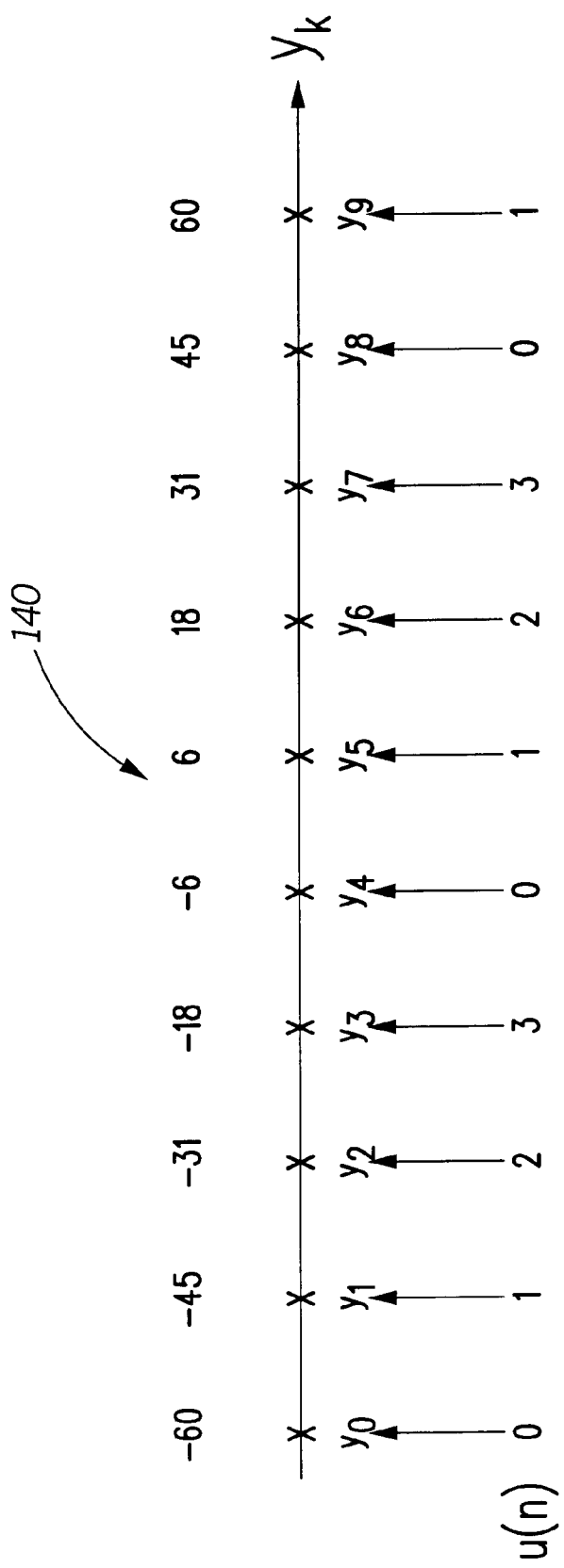
FIG. 12 is an example of a transmit constellation having equivalence classes according to this invention.

As described in co-pending application CX097028, for a given connection, depending on the line conditions, a transmit constellation for each robbed bit signaling (RBS) time slot is selected. As an example, transmit constellation 140 is depicted in FIG. 12. This constellation includes ten constellation points, $y_0-y_9$, ranging in value from −39 to 39. It should be noted that the constellation points, y(n), are not necessarily G.711 $\mu$-law levels.

The constellation points y(n) correspond to digital data to be transmitted, u(n). In other words, each constellation point represents a group of data bits and the number of data bits represented by each constellation point depends on the number of points in the constellation (and the number of equivalence classes which are described below). The more points in the constellation, the more bits of data that can be represented. As shown in FIG. 12, digital data u(n) is divided into four groups of bits 0,1,2 and 3, corresponding to 00, 01, 10 and 11, for example. Thus, in this example each constellation point transmitted represents two bits and since the constellation points are transmitted at 8 k/sec, the data rate is 16 kbps. It must be understood that this is a simplified example and data may be mapped into u(n) using any mapping schemes that can map bits into equivalence classes, such as shell mapping or modulus conversion.

According to this invention, the constellation points are grouped into equivalence classes. An equivalence class is a set of typically two or more constellation points which represent the same group of bits or digital data to be transmitted, u(n). With constellation 140, it is shown that constellation points $y_0(-60)$, $y_4(-6)$, and $y_8(45)$ form the equivalence class for u(n)=0. Constellation points $y_1(-45)$, $y_5(6)$, and $y_9(60)$ form the equivalence class for u(n)=1 and constellation points $y_2(-31)$, and $y_6(18)$ form the equivalence class for u(n)=2. Finally, constellation points $y_3(-18)$, and $y_7(31)$ form the equivalence class for u(n)=3.

Equivalence class selection is generally accomplished as follows. The constellation, with M points, is indexed as $y_0$, $y_1$, ... $y_{M-1}$ in ascending (or descending) order. Assuming u(n) has U values, e.g. U=4 as in the above example, then the equivalence class for u(n)=u contains all the $y_k$'s where k modulo U is u. For example, in FIG. 11, the equivalence class for u(n)=0 is $y_0$, $y_u$, $y_{2U}$, where U=4. Note that each equivalence class is not required to have the same number of constellation points.

The number of supporting data levels for u(n) should be chosen to satisfy the following two conditions: 1) The expansion ratio, which is defined as the ratio between the number of constellation points for y(n) and the number of supporting data levels for u(n), i.e., M/U; and2) TX power constraints.

The expansion ratio should be large enough to guarantee stable operation. The size of the expansion ratio will depends on the channel characteristics. In voice band modem applications, there is at least one spectral null at f=0. Therefore, we should have an expansion ratio of $M/U \geq 2$ to make the system stable. In practice, to guarantee the stability, the quality of the channel is determined from the channel response, c(n), and the minimum expansion ratio is set accordingly. For example, we can use C(f=4 kHz), the frequency response of the channel at 4 kHz (with respect to other frequencies like 2 kHz), as the quality of the channel and depending on that quality we set the minimum expansion ratio. If the C(f=4 kHz) C(f=2 kHz), then we set $M/U \geq 2.0$. As the C(f=4 kHz) gets smaller and smaller, the expansion ratio must be increased.

As described below, precoder 122' selects the appropriate constellation point, $y_k$, from the equivalence class for the data, u(n), to be transmitted and determines a value for x(n) that will produce the selected constellation point at the input to $\mu$-law quantizer 130'.

The preceding scheme, i.e., the design of precoder 122' and prefilter 124', are now described as follows. From the characteristics of analog channel 113', c(n), n=0,1, ... $N_c$-1, determined by digital PCM modem 118', as described in co-pending application Ser. No. 08/999,416 entitled Device and Method for Detecting PCM Upstream Digital Impairments in a Communication Network, CX097029, which is assigned to the assignee of the present invention and which is incorporated herein in its entirety by reference, an optimal target response p(n), n=0, 1, ... $N_p$-1, and corresponding prefilter g(n), n=$-\Delta$,$-\Delta+1$, ... , $-\Delta+N_g-1$ (where $\Delta$ is the decision delay), as shown in FIG. 10, are determined. This problem is similar to determining the optimal feedforward and feedback filters for a decision feedback equalizer (DFE).

The prefilter corresponds to feedforward filter of DFE and the target response corresponds to feedback filter of DFE. See, N. Al-Dhahir, et al, "Efficient Computation of the Delay Optimized Finite Length MMSE-DFE", IEEE Transactions On Signal Processing, vol. 44, no. May 5, 1996, pp.1288–1292. Preferably, the target response p(n) and the filter g(n) will be determined in the analog modem, but they can be determined in the digital modem and transmitted to the analog modem.

The prefilter g(n), n=$-\Delta$,$-\Delta+1$, ... , $-\Delta+N_g-1$, and the target response p(n), n=0, 1, ... , $N_p$-1, (where p(0)=1) can be derived given c(n) by minimizing the cost function $\zeta$ as follows:

$$\zeta = \|g(n)*c(n) - p(n)\|^2 + \alpha\|g(n)\|^2 \tag{4}$$

The first term ensures small intersymbol Interference (ISI), i.e., the receiver of digital PCM modem 118' receives what precoder 122' tried to encode, and the second term enforces the transmit (TX) power to stay finite and small. The term $\alpha$ is a constant term which should be chosen depending on the application. The larger $\alpha$ is the lower the TX power will be, but at the expense of ISI. A smaller $\alpha$ will give less ISI at the expense of TX power. Therefore $\alpha$ should be chosen depending on what is desired for ISI and TX power for a given application. As an example, $\alpha$ can be chosen to be the signal to noise ratio (SNR) of the system, which is $\sigma_n^2/E(x^2)$ or SNR normalized by channel energy, i.e., $SNR/\|c\|^2$. For $E(x^2)$, we can use −9 dBm which is the power constraint for upstream transmission. This minimization problem is the same as DFE tab initialization problem. The term $\sigma_n^2$ can be determined as described in co-pending application CX097028.

The initially determined p(n) and g(n) can always be used if the analog channel c(n) is time invariant. However, in practice, c(n) is time variant, though it is very slowly changing. Therefore, some kind of adaptation scheme is necessary. One way to do it is to monitor performance and retrain if the performance goes bad, i.e., re-estimating c(n) in the digital modem 118' and sending a new c(n) back to analog modem 112' to recalculate g(n) and p(n). Another way is to feedback the analog channel error signal, error(n), as described in co-pending application CX097029, from digital modem 118' to analog modem 112' through downstream data transmission and use that error signal to adapt p(n) and g(n).

Once the target response p(n) is determined precoder 122' can be implemented. As explained above, we can send data u(n) by transmitting x(n) such as to produce at the input to quantizer 130', FIG. 10, a constellation point y(n) which is one of the points in the equivalence class of u(n). Which constellation point from the equivalence class of u(n) to use to represent u(n) is usually selected to minimize the TX power of transmitter 120'. The TX power of transmitter 120' is the power of z(n) (or some other metric). In practice, since it is hard to minimize the power of z(n), the power of x(n) is minimized instead, which is a close approximation of minimizing z(n).

The following is a known relationship among x(n), y(n) and p(n):

$$y(n) = p(n)*x(n) \tag{5}$$

where "*" represents convolution. That relationship can be expressed as follows:

$$y(n) = p(0)x(n) + p(1)x(n-1) + \ldots p(N_p)x(n-N_p) \tag{6}$$

Since p(0) is designed to equal to 1, then equation (6) can be simplified as follows:

$$x(n) = y(n) - \sum_{i=1}^{N_p} p(i)x(n-i). \quad (7)$$

And, since p(n) and the past values of x(n) are known, the appropriate y(n), among the constellation points of the equivalence class of a given u(n), may be selected to minimize $x^2(n)$ in order to minimize the TX power of transmitter 120'.

Or, lookahead (i.e., decision delay) can be introduced to choose y(n). That is, y(n–Δ) can be chosen from the set of equivalence classes for u(n–Δ) to minimize $$|x(n-\Delta)|^2+|x(n-\Delta+1)|^2+\ldots+|x(n)|^2,$$

where:

$$x(n-j) = y(n-j) - \sum_{i=1}^{N_p} p(i)x(n-j-i) \quad (8)$$

where j=0, 1, ... Δ and where y(n–j) is chosen from the set of equivalence classes of u(n–j) (j=0, 1, ... Δ–1).

Figure 13:
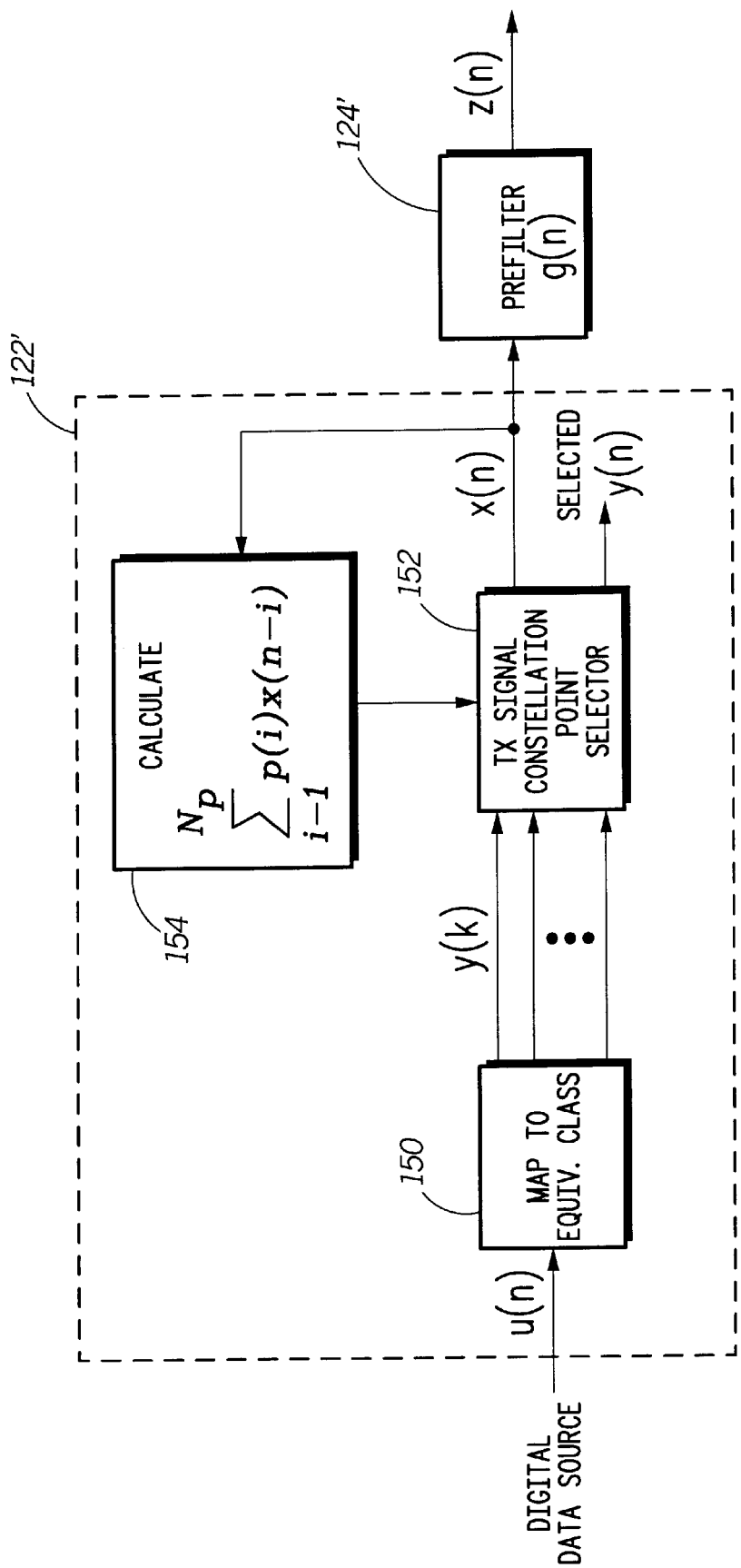
FIG. 13 is a more detailed block diagram of the analog PCM modem transmitter of FIG. 10 according to this invention.

Precoder 122' may be implemented according to this invention as depicted in FIG. 13. Precoder 122' includes a mapping device 150 which receives the incoming digital data u(n) from a digital data source and, depending on the number of bits that can be transmitted with each constellation point, determines for each group of bits the equivalence class associated with the group of bits. Mapping device 150 outputs the constellation points, $y_k$, forming the equivalence class to TX signal/constellation point selector 152 which selects the constellation point, $y_k$, from the equivalence class and determines the transmit signal x(n) based on the input from calculation device 154.

Filter device 154 receives the transmit signal x(n) and calculates the summation term (or running filter sum (RFS)) of equation (7) above. Based on the value of the RFS, TX signal/constellation point selector 152 selects the constellation point in the equivalence class that will cause x(n) in equation (7) to be closest in value to zero and calculates the value of x(n) from the calculated RFS and the selected constellation point. The calculated transmit signal x(n) is then provided to prefilter 124' where x(n) is filtered to form signal z(n) which is transmitted over analog channel 113', FIG. 10.

In order to limit the TX power of transmitter 120', FIG. 10, to keep it within the FCC regulations, the equivalence classes for u(n) must be designed accordingly. With a constellation having a predetermined number of constellation points, If we want to send more data, then more groups of data, u(n), and hence equivalence classes for u(n) will be required. As a result, the constellation points will be further away and will require more transmit power. This is because y(n) is chosen as described below according to equation (7) to minimize $x^2(n)$. Therefore, if the constellation points in the equivalence classes are spaced further apart, it is more likely that $x^2(n)$ will be larger. Thus, to reduce the TX power, we can make the equivalence class of u(n) closer at the expense of rate. This is depicted in FIGS. 14A and 14B.

Figure 14A:
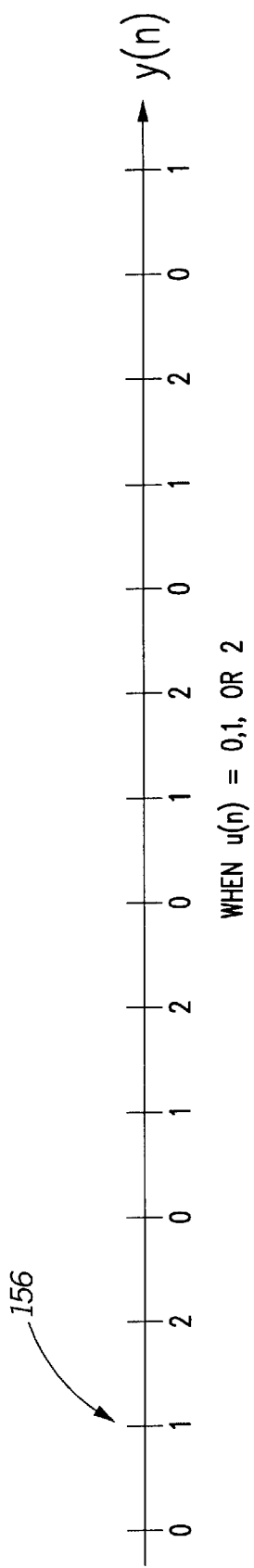
FIG. 14A is another example of a transmit constellation having equivalence classes according to this invention.
Figure 14B:
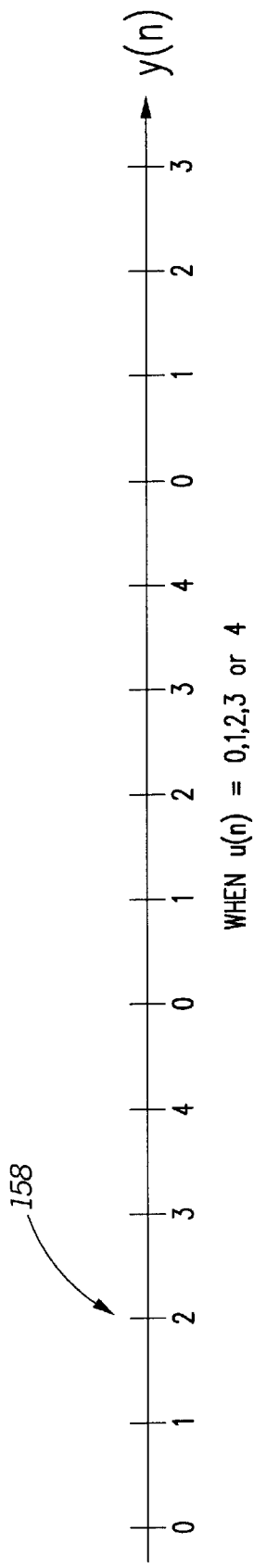
FIG. 14B is yet another example of a transmit constellation having equivalence classes according to this invention.

In FIGS. 14A and 14B, both constellations 156, FIG. 14A, and 158, FIG. 14B, have the same number of constellation points; however, constellation 156 has only three equivalence classes u(n)=0,1 and 2 while constellation 158 has five equivalence classes u(n)=0,1,2,3 and 4. Using constellation 158 will require more TX power than constellation 156, but it will be capable of transmitting at a higher data rate.

The approximate TX power (the power of z(n)) can be calculated as follows when U is the number of points desired to support u(n):

$$P_z \approx |g(n)|^2 \frac{1}{U} \sum_{i=0}^{U-1} dist^2(u(n)=i)/12 \quad (9)$$

where $|g(n)|^2$ is the energy of prefilter and dist(u(n)=i) is the minimum distance between the points in the equivalence points. For example, in FIG. 12 dist(u(n)=0)=|−6−(−60)|=54. Several values of U should be tried to find out the one which satisfies the power constraints. Note also that this should be done for each time slot.

The transmit constellation selection and equivalence class selection according to this invention may be summarized as follows:

1) Obtain digital impairments, calculate noise variance, $\sigma_n^2$, and echo variance, $\sigma_e^2$, as described in co-pending application CX097028;
2) From $\sigma_e^2$, $\sigma_n^2$, and the digital impairments, choose the proper constellation for y(n) for each time slot, also as described in co-pending application CX097028; and
3) For each time slot, find the number of points that can be supported for u(n) while satisfying the TX power constraints and the minimum expansion ratio to guarantee stable operation. From this U the constellation for y(n), and the equivalence classes for u(n) can be determined.

The above preceding technique which utilizes a one dimensional constellation can be expanded to multi-dimensional constellations by expanding the definition of the equivalence class of u(n). The following references describe various downstream preceding techniques using multi-dimensional constellations: Eyuboglu, Vedat; "Generalized Spectral Shaping for PCM Modems," Telecommunications Industry Association, TR30.1 Meeting, Norcross, Ga., Apr. 9–11, 1997, pages 1–5; Eyuboglu, Vedat; "Convolutional Spectral Shaping," Telecommunications Industry Association, Tr30.1 Meeting, Norcross, Ga., Apr. 9–11, 1997; Eyuboglu, Vedat; "More on Convolutional Spectral Shaping," ITU Telecommunications Standardization Sector 009, V.pcm Rapporteur Meeting, La Jolla, Calif., May 5–7, 1997; Eyuboglu, Vedat; "Draft Text for Convolutional Spectral Shaping," ITU-T SG 16 Q23 Rapporteur's Meeting, Sep. 2–11, 1997, Sun River, Oreg.; Eyuboglu, Vedat; "A Comparison of CSS and Maximum Inversion," Telecommunications Industry Association, Tr30.1 Meeting on PCM Modems, Galveston, Tex., Oct. 14–16, 1997; and Eyuboglu, Vedat; "Draft Text for Convolutional Spectral Shaping," Telecommunications Industry Association, Tr30.1 Meeting Galveston, Tex., Oct. 14–16, 1997.

Moreover, the example described above is for an uncoded system. However, the principals can be easily applied to a coded system, for example a trellis coded system. The only difference in this case is that the equivalence classes are further partitioned into subsets, which are used to construct the trellis code.

Generalized PCM Precoding

Figure 15:
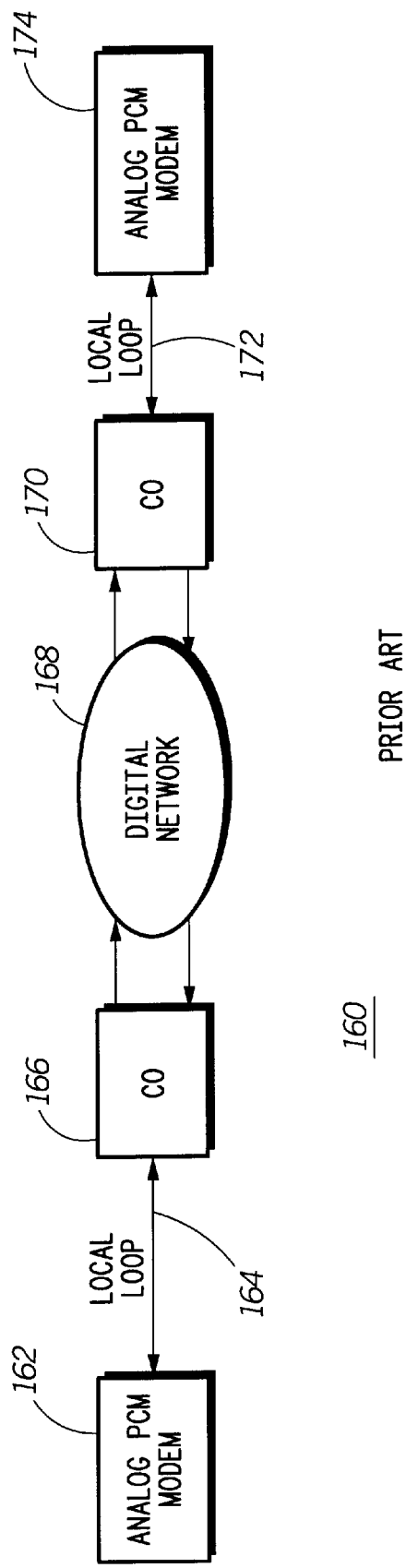
FIG. 15 is a block diagram of a typical analog PCM modem to analog PCM modem communication system.

The above described PCM upstream precoding technique (i.e. from analog PCM modem 112', FIG. 10, to digital PCM modem 118, may be applied to an analog PCM modem to analog PCM modem connection as depicted in FIG. 15. System 160 includes analog PCM modem 162 connected to CO 166 over analog loop or channel 164. CO 166 is interconnected to digital network 168. Similarly analog PCM modem 174 is connected to CO 170 over analog loop or channel 172. And, CO 170 is connected to digital network 168.

Figure 16:
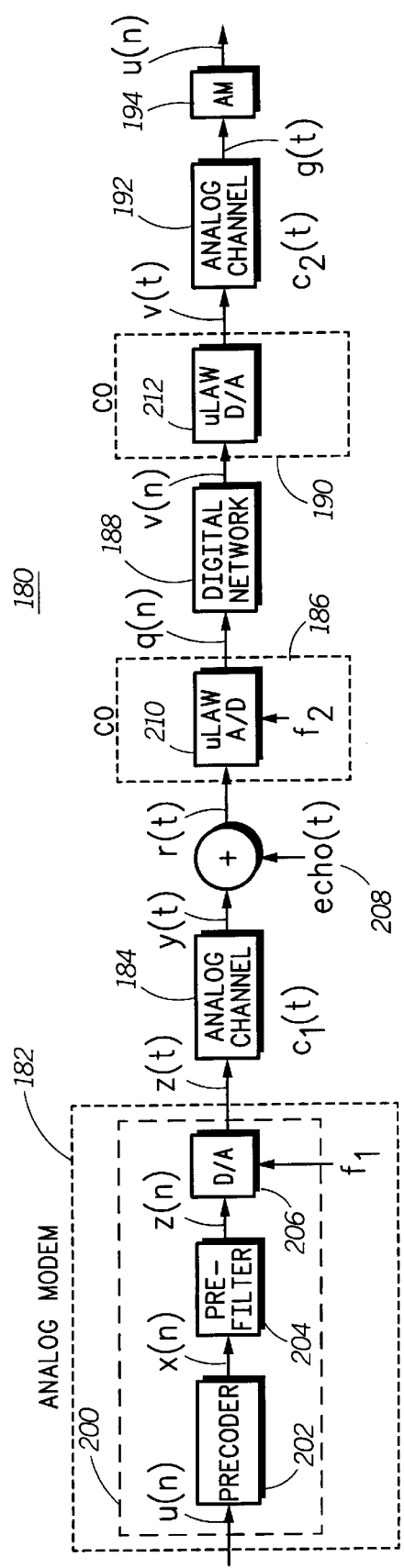
FIG. 16 is a more detailed block diagram depicting PCM transmission with the PCM modem communication system of FIG. 15.

Block diagram 180, FIG. 16, depicts an analog PCM modem to analog PCM modem connection according to this invention. In block diagram 180 there is included analog PCM modem 182 interconnected to analog channel 184. Analog PCM modem 182 includes transmitter 200 having a precoder 202, prefilter 204 and a digital to analog converter (D/A) 206. Precoder 202 receives digital data u(n) and outputs precoded digital data x(n). The precoded digital data is filtered by prefilter 204 to form signal z(n) which is provided to D/A 206. D/A 206 converts the filtered signal z(n) to analog form and transmits analog signal, z(t), over analog channel 184, having a channel characteristic, c(t).

The analog channel modifies the transmitted signal z(t) to form signal y(t). The signal y(t) then encounters PCM echo, echo(t) 208, that is added to y(t), producing signal r(t). Signal r(t) is received by μ-law (A-law in some countries outside of the US) quantizer 210 in central office (CO) 186 and is quantized according to the μ-law. See International Telecommunications Union, Recommendation G.711, Pulse Code Modulation (PCM) of Voice Frequencies, 1972.

The quantized octets (digital values), q(n), are transmitted over digital network 188 at a frequency of 8 kHz where they may be affected by various digital impairments, as discussed below. The possibly affected octets, v(n), are received by CO 190 and the octets, v(n), are converted by μ-law D/A 212 into analog levels for transmission over analog channel 192. The levels are received by analog PCM modem 194 which converts the levels to data u(n).

Figure 17:
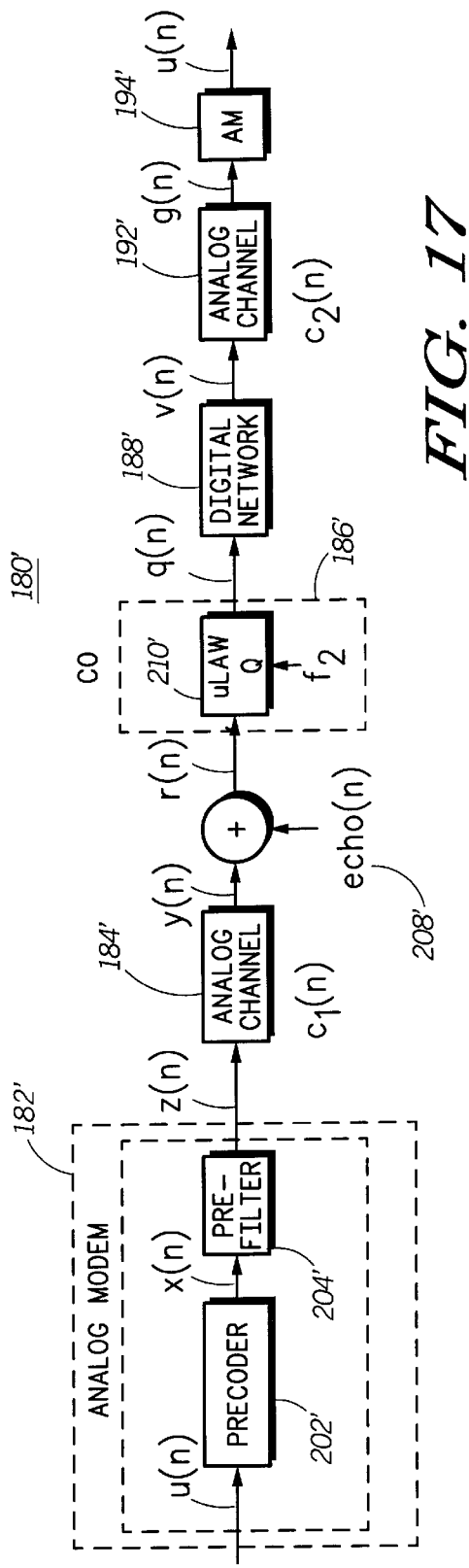
FIG. 17 is an equivalent discrete time block diagram of the block diagram of FIG. 16.

Once the clocks f1 to f2 of D/A 206 and D/A 210 are synchronized, block diagram 180 can be modeled as discrete time block diagram 180', FIG. 17. Analog PCM modem should do the equalization to get v(n) from g(n) in the same way as a downstream PCM modem works as is known in the art. Then, from v(n), a PCM upstream decoding algorithm to decode y(n), i.e. u(n), is undertaken.

The above only describes transmission from analog PCM modem 182' to analog PCM 194'; however, transmission in the other direction is accomplished in the same manner. The above described PCM upstream preceding technique (i.e. from analog PCM modem 112', FIG. 10, to digital PCM modem 118,) can be applied directly to an analog PCM modem to analog PCM modem connection as depicted in FIGS. 15–17.

It should be noted that this invention may be embodied in software and/or firmware which may be stored on a computer useable medium, such as a computer disk or memory chip. The invention may also take the form of a computer data signal embodied in a carrier wave, such as when the invention is embodied in software/firmware which is electrically transmitted, for example, over the Internet.

The present invention may be embodied in other specific forms without departing from the spirit or essential characteristics. The described embodiments are to be considered in all respects only as illustrative and not restrictive. The scope of the invention is, therefore, indicated by the appended claims rather than by the foregoing description. All changes which come within the meaning and range within the equivalency of the claims are to be embraced within their scope.

What is claimed is:

1. A transmitter which defines an equivalence class at the input of a quantization device for precoding a sequence of analog levels to be transmitted over an analog channel to said quantization device, the precoded sequence forming the input to the quantization device, comprising:

a precoder including a mapping device for mapping data bits to be transmitted to as a sequence of equivalent classes, wherein each equivalence class contains one or more constellation points; and a constellation point selector interconnected to the mapping device which selects a constellation point in each equivalence class to represent the data bits to be transmitted and which transmits a level that produces the selected constellation point to an input of the quantization device.

2. The transmitter of claim 1 further including a filter device, operably coupled to the constellation point selector, which receives at its input previously transmitted levels and provides its output to the constellation point selector.

3. The transmitter of claim 2 wherein the constellation point selector selects the constellation point from each equivalence class based on the output of the filter device.

4. The transmitter of claim 3 further including a prefilter, having a predefined filter response, g(n), for filtering the level transmitted by the constellation point selector.

5. The transmitter of claim 4 wherein the response of the filter device is:

$$\sum_{i=1}^{N_p} p(i)x(n-i)$$

where p(i) is a target response and x(n-i) represents the previously transmitted levels.

6. The transmitter of claim 5 wherein the target response, p(n), and the prefilter response, g(n), are derived from the predetermined response, c(n), of the analog channel.

7. The transmitter of claim 5 wherein the constellation point selector transmits the levels, x(n), according to the following function:

$$x(n) = y(n) - \sum_{i=1}^{N_p} p(i)x(n-i)$$

where y(n) are the constellation points.

8. The transmitter of claim 7 wherein the constellation point selector selects the constellation point in each equivalence class which minimizes the transmit power of the transmitter by selecting the constellation point, y(n), which produces the smallest value for x(n).

9. A method for providing a precoded sequence of analog levels over an analog channel to a quantization device, comprising:

mapping data bits to be transmitted to a sequence of equivalence classes, wherein each equivalence class contains one or more constellation points;

selecting a constellation point in each equivalence class to represent the data bits to be transmitted; and, transmitting a level that produces the selected constellation point to an input of the quantization device.

10. The transmitter of claim 9 wherein the step of selecting a constellation point includes filtering the previously selected constellation points with a filter device and selecting the constellation points based on the output of the filter device.

11. The method of claim 10 further including filtering the level transmitted with a prefilter having a predefined filter response, g(n).

12. The method of claim 11 wherein the response of the filter device is:

$$\sum_{i=1}^{N_P} p(i)x(n-i)$$

where p(i) is a target response and x(n-i) represents the previously transmitted levels.

13. The method of claim 12 wherein the target response, p(n), and the prefilter response, g(n), are derived from the predetermined response, c(n), of the analog channel.

14. The method of claim 12 wherein step of transmitting includes transmitting the levels, x(n), according to the following function:

$$x(n) = y(n) - \sum_{i=1}^{N_P} p(i)x(n-i)$$

where y(n) are the constellation points.

15. The method of claim 14 wherein the step of selecting includes selecting the constellation point in each equivalence class which minimizes the transmit power of the transmitter by selecting the constellation point, y(n), which produces the smallest value for x(n).

16. A computer useable medium having computer readable program code means embodied therein to function as a precoder for transmitting a precoded sequence of analog levels over an analog channel to a quantization device, comprising:
   computer readable program code means for mapping data bits to be transmitted to a sequence of equivalence classes, wherein each equivalence class contains one or more constellation points;
   computer readable program code means for selecting a constellation point in each equivalence class to represent the data bits to be transmitted; and,
   computer readable program code means for transmitting a level that produces the selected constellation point to an input of the quantization device.

17. The computer useable medium of claim 16 wherein the computer readable program code means for selecting a constellation point includes computer readable program code means for filtering the previously selected constellation points with a filter device and selecting the constellation points based on the output of the filter device.

18. The computer useable medium of claim 17 further including computer readable program code means for filtering the level transmitted with a prefilter having a predefined filter response, g(n).

19. The computer useable medium of claim 18 wherein the response of the filter device is:

$$\sum_{i=1}^{N_P} p(i)x(n-i)$$

where p(i) is a target response and x(n-i) represents the previously transmitted levels.

20. The computer useable medium of claim 19 further including computer readable program code means for deriving the target response, p(n), and the prefilter response, g(n), from the predetermined response, c(n), of the analog channel.

21. The computer useable medium of claim 19 wherein the computer readable program code means for transmitting includes computer readable program code means for transmitting the levels, x(n), according to the following function:

$$x(n) = y(n) - \sum_{i=1}^{N_P} p(i)x(n-i)$$

where y(n) are the constellation points.

22. The computer useable medium of claim 21 wherein the computer readable program code means for selecting includes computer readable program code means for selecting the constellation point in each equivalence class which minimizes the transmit power of the transmitter by selecting the constellation point, y(n), which produces the smallest value for x(n).

23. A computer data signal embodied in a carrier wave, wherein embodied in the computer data signal are computer readable program code means to function as a precoder for transmitting a precoded sequences of analog levels over an analog channel to a quantization device, wherein the analog channel modifies the transmitted analog levels, comprising:
   computer readable program code means for mapping data bits to be transmitted to a sequence of equivalence classes, wherein each equivalence class contains one or more constellation points;
   computer readable program code means for selecting a constellation point in each equivalence class to represent the data bits to be transmitted; and,
   computer readable program code means for transmitting a level that produces the selected constellation point to an input of the quantization device.

24. The computer data signal of claim 23 wherein the computer readable program code means for selecting a constellation point includes computer readable program code means for filtering the previously selected constellation points with a filter device and selecting the constellation points based on the output of the filter device.

25. The computer data signal of claim 24 further including computer readable program code means for filtering the level transmitted with a prefilter having a predefined filter response, g(n).

26. The computer data signal of claim 25 wherein the response of the filter device is:

$$\sum_{i=1}^{N_P} p(i)x(n-i)$$

where p(i) is a target response and x(n-i) represents the previously transmitted levels.

27. The computer data signal of claim 26 further including computer readable program code means for deriving the target response, p(n), and the prefilter response, g(n), from the predetermined response, c(n), of the analog channel.

28. The computer data signal of claim 26 wherein the computer readable program code means for transmitting includes computer readable program code means for transmitting the levels, x(n), according to the following function:

$$x(n) = y(n) - \sum_{i=1}^{N_P} p(i)x(n-i)$$

where y(n) are the constellation points.

29. The computer data signal of claim 28 wherein the computer readable program code means for selecting includes computer readable program code means for selecting the constellation point in each equivalence class which minimizes the transmit power of the transmitter by selecting the constellation point, y(n), which produces the smallest value for x(n).

30. In an Analog pulse code modulation (PCM) modem adapted for upstream PCM data transmission to a digital PCM modem, a precoder for preceding a sequence of analog levels transmitted over an analog channel to a quantization device, comprising:

a mapping device for mapping data bits to be transmitted to a sequence of equivalence classes, wherein each equivalence class contains one or more constellation points; and, a constellation point selector interconnected to the mapping device which selects a constellation point in each equivalence class to represent the data bits to be transmitted and which transmits an analog level that produces the selected constellation point at an input of the quantization device.

31. In an analog pulse code modulation (PCM) modem adapted for PCM data transmission to another analog PCM modem, a transmitter for precoding a sequence of analog levels transmitted over an analog channel to a quantization device, wherein the analog channel modifies the transmitted analog levels, the transmitter comprising:

a mapping device for mapping data bits to be transmitted to a sequence of equivalence classes, wherein each equivalence class contains one or more constellation points; and a constellation point selector interconnected to the mapping device which selects a constellation point in each equivalence class to represent the data bits to be transmitted and which transmits an analog level that produces the selected constellation point at an input to the quantization device.

* * * * *

UNITED STATES PATENT AND TRADEMARK OFFICE
CERTIFICATE OF CORRECTION

PATENT NO. : 6,198,776 B1
DATED : March 6, 2001
INVENTOR(S) : Eyuboglu, Vedat M. et al.

It is certified that error appears in the above-identified patent and that said Letters Patent is hereby corrected as shown below:

Abstract,
The 1st line which reads: "A device and method for preceding data signals for pulse.... delete "preceding" and insert -- precoding -- such that the line reads, "A device and method for precoding data signals for pulse"

Signed and Sealed this

Sixteenth Day of October, 2001

Attest:

NICHOLAS P. GODICI
Attesting Officer     Acting Director of the United States Patent and Trademark Office